United States Patent [19]

Detlefsen et al.

[11] Patent Number: 5,057,591

[45] Date of Patent: Oct. 15, 1991

[54] FOAMABILITY OF PHENOLIC RESINS

[75] Inventors: William D. Detlefsen, Eugene; Lewis D. Creel, Dexter; Lee R. Johnson, Springfield, all of Oreg.

[73] Assignee: Borden, Inc., Columbus, Ohio

[21] Appl. No.: 236,379

[22] Filed: Aug. 25, 1988

[51] Int. Cl.$^5$ .................. C08G 8/04; C08G 14/02; C08G 65/38

[52] U.S. Cl. .................. 528/140; 528/147; 528/148; 528/219; 528/254; 528/493; 428/528; 428/529; 524/21; 524/482; 156/291; 156/295; 156/323; 156/335; 156/328

[58] Field of Search .............. 528/140, 148, 147, 219, 528/254, 493; 156/291, 295, 335, 323, 328; 428/528, 529; 524/21, 482

[56] References Cited

U.S. PATENT DOCUMENTS

| | | | |
|---|---|---|---|
| 2,323,831 | 7/1943 | Menger et al. | 156/328 |
| 2,653,139 | 9/1953 | Sterling | 521/106 |
| 2,728,741 | 12/1955 | Simon et al. | 525/58 |
| 2,744,875 | 5/1956 | Thomas et al. | 521/106 |
| 2,798,054 | 7/1957 | Simon et al. | 521/136 |
| 2,806,006 | 9/1957 | Proctor et al. | 521/117 |
| 3,905,921 | 9/1975 | Cone et al. | 521/181 |
| 4,031,285 | 6/1977 | Miller et al. | 428/294 |
| 4,115,178 | 9/1978 | Cone et al. | 156/291 |
| 4,207,401 | 6/1980 | Dahms | 521/112 |
| 4,216,295 | 8/1980 | Dahms | 521/112 |

*Primary Examiner*—John Kight, III
*Assistant Examiner*—P. Hampton-Hightower
*Attorney, Agent, or Firm*—Venable, Baetjer, Howard & Civiletti

[57] ABSTRACT

The invention is a solution of highly advanced phenolic resin with improved inherent foamability that is made from the reaction of phenol, aldehyde, water and alkali the improved foamability being brought about by the incorporation of up to 1.0% by weight, anhydrous basis, lime (calcium hydroxide) into the early stages of the reaction mix. In another embodiment, the invention is a plywood glue composition comprising a solution of lime-containing highly advanced phenolic resin, dried animal blood and preferably an aldehyde glue viscosity-lowering agent.

27 Claims, 2 Drawing Sheets

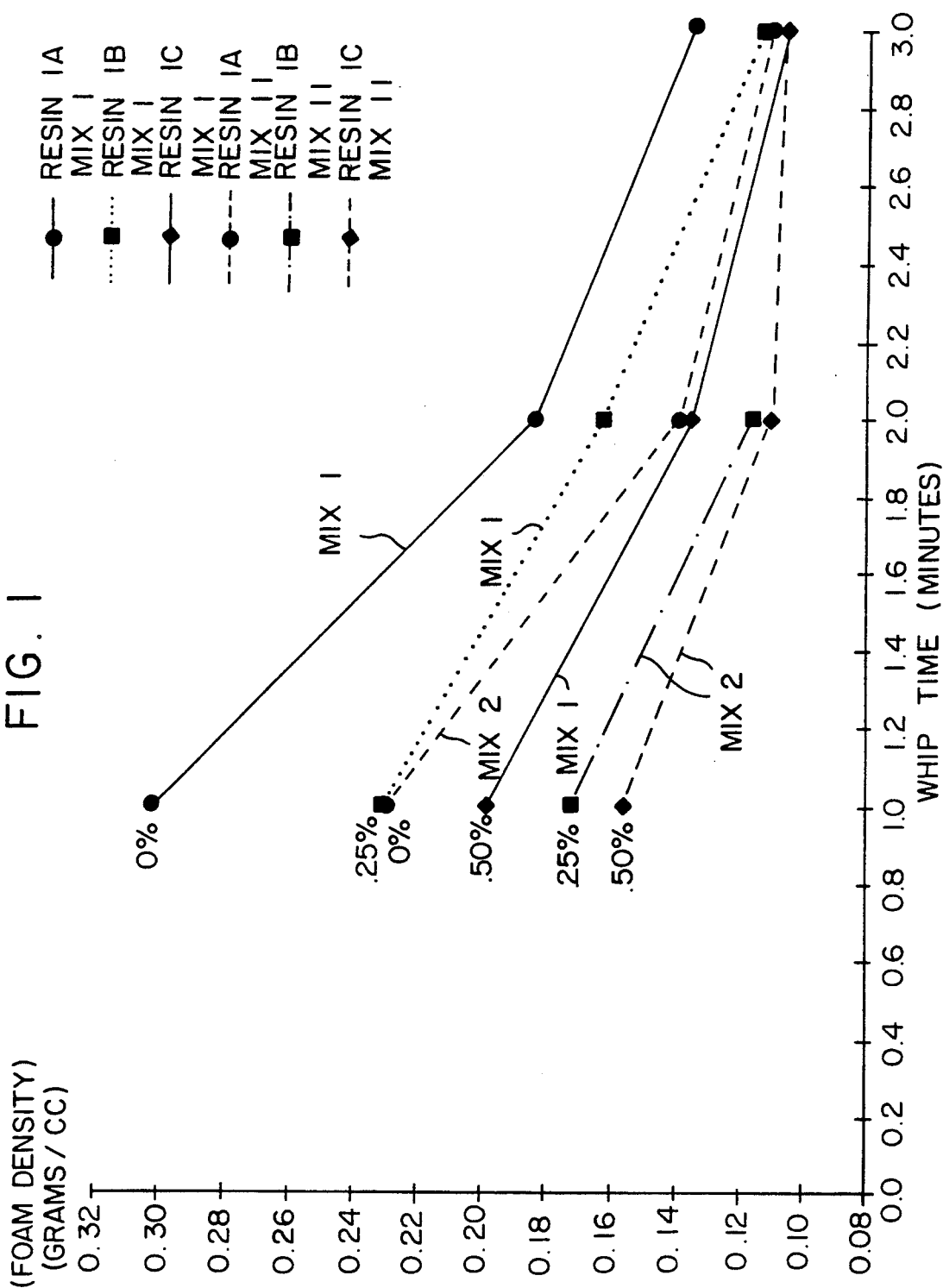

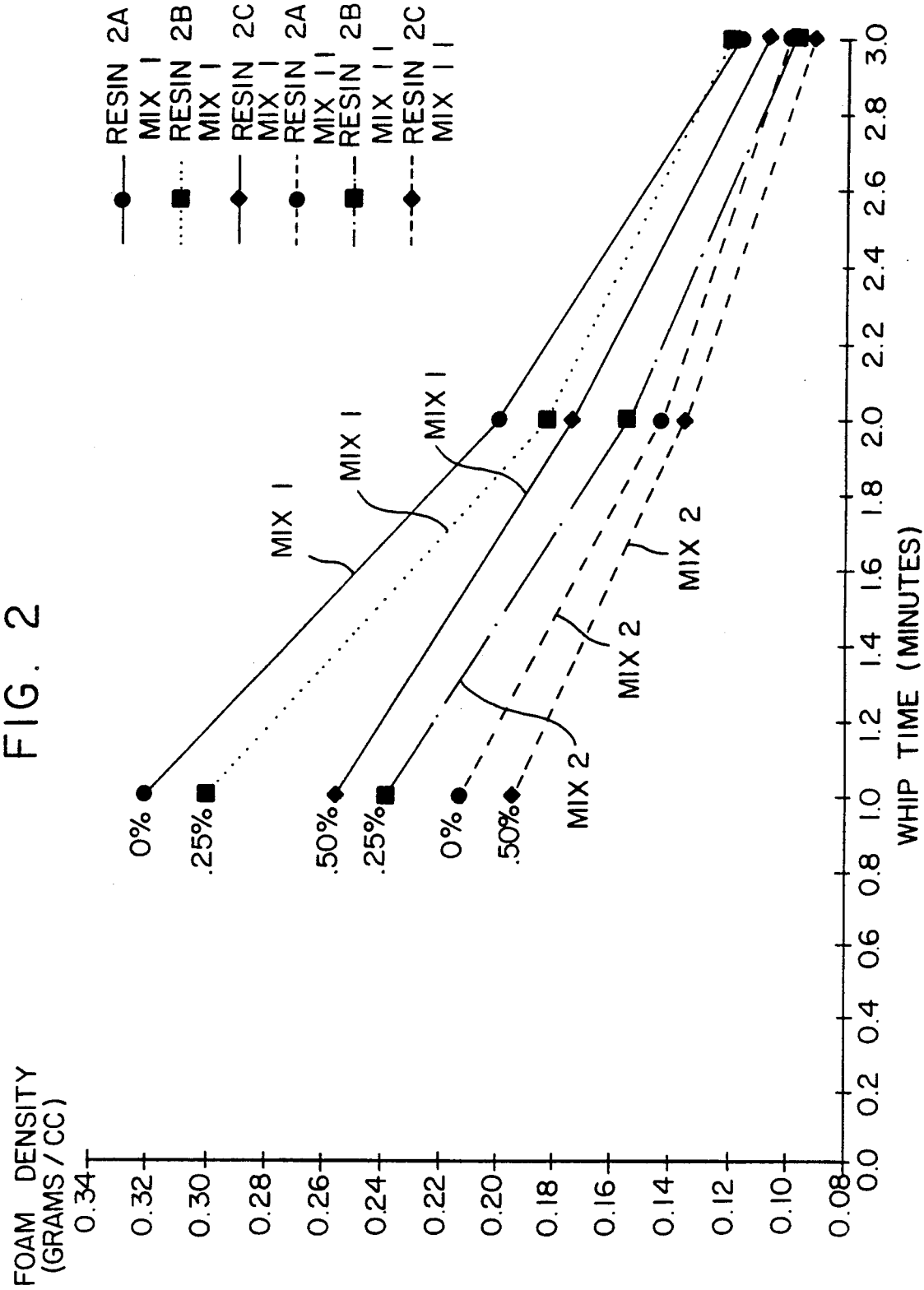

FOAMABILITY OF PHENOLIC RESINS

FIELD OF THE INVENTION

This invention relates to solutions of advanced phenolic resins with improved foamability that are useful as foamed adhesive binders in the manufacture of plywood and the like.

BACKGROUND OF THE INVENTION

Phenol-formaldehyde resins are widely used as adhesives and binders in the making of laminated products such as plywood.

One process for applying phenol-formaldehyde resins to wood laminates such as plywood is the foam extrusion process. Historically the use of the foam extrusion process to apply solutions of phenol-formaldehyde resin presupposed, of course, that the resin solutions were foamable. At first, it was possible to foam such resin solutions adequately since relatively low molecular weight phenolic resins were used in their manufacture. However, the use of phenolic resins of low molecular weight creates an economic problem in that a relatively long press time is required to cure them in the plywood hot presses. This in turn delays production and increased costs.

In an effort to overcome this problem, the plywood industry has turned to the use of more highly advanced (higher molecular weight) resins which cure faster in the press. Presently the highly advanced resins are supplied to the market in aqueous alkaline solutions containing about 40% by weight resin solids, as opposed to the low molecular weight solutions containing about 50% resin solids that were formerly used extensively.

A serious problem attended the use of highly advanced phenolic resin glues using conventional foaming techniques because they are not foamable at all, or at least with sufficient speed to be useful in the commercial production of plywood using foamed glue.

The serious problem of foaming highly advanced phenolic resin glues was overcome by the addition of various ingredients including a foaming agent such as blood.

At the present time, when phenolic glues are applied to wood laminates using the foam extrusion process, the solution of phenolic resin is mixed with water, glyoxal, spray dried blood, wheat flour, sodium hydroxide and surfactant, or various other ingredients, and then pumped through a mechanical foamer where air is introduced. The resulting foam which has a specific gravity 0.2 or less is then extruded onto the veneer sheets which are consolidated to form panels. The panels are then hot pressed to form a strong exterior bond. In this application, the terms veneer and veneer sheet are used to mean any of the thin layers or plies of wood which are bonded together to form plywood.

One key ingredient in foaming solutions of advanced phenolic resins is spray dried blood which acts as a foaming agent and also enhances foam stability. Even though blood contributes much to the phenolic based glue, it is very expensive compared to the other ingredients. Although blood is a good foaming agent, frequently the foam density still varies resulting in skipped spread and poor bonds, which if severe enough can reduce plywood production.

Plywood consists of veneer sheets bonded together with grains of alternate layers perpendicular to each other. Veneer is usually made by the rotary lathe method which comprises rotating a log of wood against a knife. Once the rotary peeled veneer is clipped, dried, and graded, it is ready to be made into plywood. The veneer sheets are spread with adhesive, and then consolidated into a package that is conveyed into a prepress that applies 125-175 psi for about three minutes. After prepressing, the package is conveyed to the hot press. Here the panels are fed into a multiple opening steam press and pressed to cure the phenolic resin. A press temperature of 285° F.-360° F. and pressure of 125-200 psi is used. Press time is dictated by panel thickness and particular lay-up. Assembly time ranges anywhere from 10 to 40 minutes with 15-20 minutes being most common. After hot pressing, panels are usually allowed to post cure in the stack for at least two hours before sawing. However, some mills immediately convey them to the saw line where they are trimmed to size.

When adhesive is applied to the veneer, several methods can be used such as rubber roll spreading, airless spraying, and curtain coating. However, foam extrusion adhesive application has come into use.

Phenolic resin based adhesives are well known in plywood manufacture. As originally adopted, phenolic adhesives were applied between confronting plies in liquid or droplet form. With the advent of a process for extrusion of foamed glue, phenolic resin based adhesives have been adapted for foam extrusion application.

Phenolic adhesives are typically foamed and then applied by a foam extruder. Foaming usually increases the volume of the adhesive about five times. The foam is extruded in flexible coherent parallel rods on the surface of veneer to be bonded, as it travels under an extrusion head.

In the preparation of foamed adhesive, as a first step, unfoamed adhesive travels through a defoamer where it is brought to a uniform density of about 0.93 grams/cc. After defoaming, the adhesive may be stored in a feed tank until it is to be foamed. From the feed tank it is metered into a foamer which rapidly converts unfoamed adhesive to foamed adhesive. The foamed adhesive is then directed through the extrusion head onto the surface to be bonded.

After extrusion of the rods of foamed adhesive onto the top surface of a veneer sheet, a second layer is placed over the adhesive and the layers are roller prepressed. Pre-pressing spreads the rods of foamed adhesive into a uniform mat which wets the adjacent surface and insures good contact between the layers.

In the foam extrusion process, if the phenolic resin base is a highly advanced resin, a foaming agent such as dried blood must be added to the resin to improve its foamability.

The Cone et al patent, U.S. Pat. No. 3,705,921, describes a plywood glue in which blood is used to improve the foamability of a more highly advanced phenolic resin. The advanced phenolic resin used by Cone et al was a resin of commerce produced by Borden, Inc., the assignee of this invention.

For the purposes of this invention, a solution of highly advanced phenolic resin solution is defined as a solution which is the condensation product of a phenol, an aldehyde, water and alkali and which has a resin solids content of from 35% to 45% by weight of resinous condensation product and a degree of advancement such as to impart to the aqueous resin solution a viscosity of from 300 cps to 1500 cps as measured on a Brookfield RVF viscometer at 25° C. with a #2 spindle at 20 RPM and has an alkali content of from 5.5% to 7.6%.

The term alkali as used herein, is defined as any of the hydroxides or soluble salts of alkali metals. The term alkalinity of a resin solution as used herein is defined as a measure of the basic properties provided by alkali compounds and alkaline earth compounds in the resin solution. The term "alkali content" of a resin solution as used herein is defined as a calculated figure of the amount of anhydrous sodium hydroxide by weight, based on the total weight of the resin solution, that would provide the same degree of alkalinity that is provided by the alkali and alkali earth compounds that are actually in the resin solution.

One of the major problems that occurs with foam extrusion glue application is that intermittently small portions of the glue will not foam. When this happens, glue foam density increases and extrusion beads break, causing areas of the ply surface to be void of glue. As one would expect, this produces poor quality plywood.

Poor glue foamability is due to a variety of factors that are very subtle, hard to define and control. The phenolic resins made according to this invention inherently foam better than comparable phenolic resins of the prior art and use of the resins of this invention should overcome some of these subtle problems.

SUMMARY OF THE INVENTION

The invention in one preferred embodiment is a process for making an aqueous alkaline solution of highly advanced phenolic resin with improved foamability from a reaction mixture consisting essentially of the reaction of phenol, aldehyde, water, and alkali, said reaction mixture further including up to about 1% by weight of anhydrous lime (calcium hydroxide), based on the weight of the reaction mixture, added into the early stages of the reaction.

In another embodiment, the invention is a highly foamable glue composition comprising an aqueous alkaline solution of lime-containing highly advanced phenolic resin, dried animal blood, water, and preferably an aldehyde glue viscosity-lowering agent.

In another embodiment, the invention is a process for the production of laminated cellulosic board by bonding laminates of cellulosic material under heat and pressure using as the binder a foamed glue composition. This glue composition comprises an aqueous alkaline solution of lime-containing highly advanced phenolic resin, dried animal blood, water, and preferably an aldehyde glue viscosity-lowering agent.

In another embodiment the invention is a process for the production of plywood from layers of veneer by bonding the layers of veneer to each other under heat and pressure using as the binder a foamed glue composition, said glue composition comprising an aqueous alkaline solution of lime-containing highly advanced phenolic resin, dried animal blood, water, and preferably an aldehyde glue viscosity-lowering agent. The invention also encompasses plywood or other laminase produced in this manner.

BRIEF DESCRIPTION OF THE DRAWINGS

FIG. 1 is a graph in which the foam density of whipped glue mix in grams/cc is plotted versus the time period in minutes during which the glue mix was whipped. The foam density is measured immediately after being whipped. The glue mixtures on which he graph is based were made from the lime-modified phenolic resin solutions and the control resin of Example 1, as described below. This figure shows the following for each of the two glue formulations. A glue mix made with lime-modified phenolic resin solution had greater foamability (i.e. lower foam density) than the control mix which was made with phenolic resin solution that was not lime-modified. Glue mix made with phenolic resin solution modified with 0.50% lime had greater foamability than the comparable glue mix made with phenolic resin solution modified with 0.25% lime.

FIG. 2 is a graph in which the foam density of whipped glue mix in grams/cc is plotted versus the time period during which the glue mix was whipped. The glue mixes on which the graph is based were made from the lime-modified phenolic resin solutions and the control resin of Example 2. This figure shows the following for each of the two glue formulations. A glue mix made with lime-modified phenolic resin solution had greater foamability (i.e. lower foam density) than the control mix which was made with phenolic resin solution that was not lime-modified. Glue mix made with phenolic resin solution modified with 0.50% lime had greater foamability than the comparable glue mix made with phenolic resin solution modified with 0.25% lime.

DETAILED DESCRIPTION OF THE INVENTION

The invention in one preferred embodiment is an aqueous alkaline solution of a lime-containing highly advanced phenolic resin. The highly advanced phenolic resins of commerce that are used for formulating adhesives for bonding wood laminates are generally made by the condensation reaction of phenol, aldehyde, water and sodium hydroxide. Cone et al, in the patent referred to above, used a more highly advanced resin of commerce, "Borden W-166S". The improved advanced phenolic resin solution of this invention is made by adding lime in an early stage of the condensation reaction of a reaction mixture of phenol, aldehyde, water, and sodium hydroxide.

The resinous condensation product of a phenol and an aldehyde may comprise any of those resinous condensation products suitable for use in the production of plywood-type glues. Typical phenols that may be used comprise phenol itself (benzenol), the cresols, and resorcinol. Typical aldehydes include formaldehyde, acetaldehyde, and furfural. The commonest of such products, and the one that is used in the examples of the invention, is the resinous condensation product of phenol (benzenol) and formaldehyde.

The more highly advanced phenolic resin solutions of commerce as well as those made in the examples of this invention are characterized by having a relatively high degree of advancement so that the resin will set rapidly in a plywood press, i.e. in a matter of several minutes less as compared with the time required when phenolic resins having conventional degree of advancement are used.

The degree of advancement of such resins is a difficult property to characterize. However, for present purposes highly advanced phenolic resins solutions are those which have a resin solids content of from about 35-45% by weight and the resins have a degree of advancement such as to impart to the aqueous alkali resin solutions in which they are contained a viscosity in the range of from 300 cps to 1500 cps as measured on a Brookfield RVF Viscometer at 25° C. with a #2 Spindle at 20 RPM.

In another embodiment, the invention is rapidly-foamable liquid phenolic glue comprising a solution of lime-modified highly advanced phenolic resin, dried animal blood, water and preferably an aldehyde glue viscosity lowering agent. By incorporating up to 1.0% anhydrous lime by weight (or equivalent) based on total weight of the reaction mix into the early stage of the reaction of the highly advanced phenolic resin, it is possible to improve the inherent foamability of the phenolic resin produced and thereby reduce the quantity of dried animal blood needed to make foamed adhesive for bonding wood laminates. A reduction of the quantity of blood needed reduces costs. It is contemplated that the use of these lime-containing resins will allow more freedom in the selection of other resin composition variables such as wheat flour, surfactant, and the like.

Applicants have discovered that the viscosity stability of adhesive systems which contain lime-modified highly advanced phenolic resins is enhanced when compared to adhesive systems which contain unmodified highly advanced phenolic resin. This improvement comes about because smaller amounts of blood are needed to make the adhesive system.

It is theorized that the improved foamability of the lime modified phenolic resin solution of this invention comes about because lime is a divalent catalyst. It is contemplated that an improved resin could be made using other alkaline earth hydroxides or mixtures thereof in place of lime.

Anhydrous lime was used in the examples of this invention. Anhydrous lime (i.e. anhydrous calcium hydroxide) is a standard item of commerce and is in powdered form. It is contemplated that any alkaline earth metal hydroxides or soluble alkaline earth metal salts in anhydrous or hydrous form could be used in place of anhydrous lime.

The blood used to make the adhesives of the invention may be the dried blood of commerce available in powdered form. This product is manufactured by collecting beef, hog or sheep blood from the slaughter house floor and dehydrating it under controlled conditions to a dry powder form.

In one successfully operated commercial process, the blood is sprayed into a cyclone separator containing hot air under carefully controlled conditions of temperature and time to produce a spray dried blood product of desired properties. By controlling the operating variables the degree of water solubility of the dry blood may be varied over a range of from completely soluble to completely insoluble in water.

Although it is possible to use any of the solubility grades of blood, from completely soluble to completely insoluble, it is preferred to use a dried blood product having a water solubility of from 30%-90% by weight. Blood products having a solubility of less than 30% are not quite as efficient as foaming agents as are those having a greater degree of water solubility. On the other hand, blood products having a water solubility of more than 90% may cause gelation of the compositions.

The aldehyde glue viscosity lowering agent that is preferably used to make the adhesives may be any suitable aliphatic or aromatic aldehyde. Typical aldehydes which may be used are the lower aliphatic aldehydes including formaldehyde; the formaldehyde donors, such as paraformaldehyde, sodium sulfite formaldehyde, and onyzolidine; glyoxal; glutaraldehyde; pyruvicaldehyde and the lower molecular weight aromatic aldehydes such as benzaldehyde. These aldehydes may be used singly or in combination with each other. They are used in an amount sufficient to reduce the viscosity of the glue to the desired level.

In the experiments which demonstrate the invention, solutions of lime-modified highly advanced phenol resins were prepared. These resins were made up into glue formulations comprising resin, blood, water and glyoxal as the viscosity lowering agent. The foamability of each glue formulation was then tested by whipping the glue for an appropriate time and measuring the density of the foamed glue.

The experiments showed that an adhesive comprising phenolic resin made from a reaction mix containing up to about 1.0% anhydrous lime by weight based on the total weight of the reaction mix foamed better than an adhesive made with resins containing lesser amounts of lime or no lime.

In the examples, the highly advanced phenolic resin solutions were prepared using standard procedures and equipment.

In the examples, the resin glue mixes were made from water, glyoxal, blood and resin solution The blood used was California Spray Dry beef blood having a solubility of 77%±2.5%. It is contemplated that other kinds of dried blood or dried blood blends could be used. The glyoxal used was an aqueous solution containing 40% glyoxal. Unless otherwise stated, the mixing of water, glyoxal, blood and resin was done by hand using a beaker and a spatula. Under commercial conditions in a plywood mill, a mechanical mixer would be used.

In the examples, in order to measure the foamability of the mixes, a mechanical foamer was used. The mechanical foamer used consisted of a cylinder (stator) and mixing blade (rotor) that whipped air into the glue. Air pressure was applied to the cylinder and a regulator was used to control air pressure. Glue was poured into the cylinder and sealed; air was loaded to 65 psi and the agitator (rotor) was turned on. The glue was whipped for the desired time and the foamer was then turned off and air was released. When the air pressure was released the glue foamed up in the cylinder. The foamer was then opened and a sample of the foamed glue was removed and its density was determined. The foam density was determined by filling a foam sample into a cup of known volume so as to completely fill the cup and weighing the filled cup. This weight, tared for the weight of the cup, is divided by the cup-weight of water, tared for the weight of the cup.

A glue mix of water, glyoxal, blood and resin which foams to give a foam density of 0.18 grams/cc or less is considered a good mix to use for the foam gluing of wood laminates.

In the examples, when the mechanical foamer was used, 100 mls of glue mix was placed in the cylinder; the rotor was rotated at 650 RPM and the air pressure was maintained at 65 psi. Whipping time was either one, two or three minutes.

Two series of tests were run and the results are reported below in Example I and Example 2. In each example, a set of three comparable highly advanced phenolic resins with different amounts of lime were prepared and designated A (control - no lime), B, and C.

Subsequently, different glue mixes, designated Mix I and Mix II, were made up. The glue mixes were foamed and the density of each foamed glue was measured.

The invention will be demonstrated by the following examples. In these examples and elsewhere throughout the specification, parts and percentages are by weight and temperatures are in degrees Celsius unless expressly indicated otherwise. Weights of ingredients are given on an as is basis unless otherwise indicated. In all the examples which describe the preparation of the solutions of advanced phenolic resin, the progress of the reaction was measured by a Gardner-Holt viscometer. All Brookfield viscosity values recited hereinabove and in the appended claims are made with reference to an RVF Brookfield Viscometer using a #2 spindle at 20 RPM and at 25° C. unless otherwise specified.

EXAMPLE 1

Part I

Preparation of Solutions of Highly Advanced Phenolic Resins

In Example 1, the resins were made from 4,000 gram batches of a mixture of phenol (benzenol), formaldehyde, water, sodium hydroxide and lime. The phenol used was an aqueous solution containing 86.3% phenol; the formaldehyde solution used was a 50% aqueous solution; the sodium hydroxide solution used was a 50% aqueous solution and the lime was powdered anhydrous calcium hydroxide.

Three resins were prepared Resin IA, (control - no lime); Resin IB, containing 0.25% lime by weight based on the total weight of the reactants; and Resin IC, containing 0.50% lime.

Preparation of Resin IA (control - no lime)

1034.88 grams of phenol, 1281.56 grams of formaldehyde solution and 1083.56 grams of water were charged into the reaction pot and heated to 50° C. 304 grams of sodium hydroxide solution were charged over a period of about 60 minutes with the temperature held at 65° C. The mix was then heated to 96° C. and condensed to "B-C" (as measured by Gardner Holt viscometer). 296 grams of sodium hydroxide solution were charged over 15 minutes The mix was condensed to "J" at 96° C. and then condensed to "V" at 84° C. followed by full cooling.

Preparation of Resin IB (0.25% lime)

1034.88 grams of phenol; 1281.56 grams of formaldehyde solution and 1073.56 grams of Water were charged and heated to 50° C. 10 grams of anhydrous lime (calcium hydroxide) was charged and the mixture was held for ten minutes to just below 65° C. 304 grams of sodium hydroxide solution were charged over 60 minutes holding the temperature at 65° C. The resin was heated to 96° C. and condensed to "B-C". 296 grams of 50% sodium hydroxide solution was charged over 15 minutes and the mix was condensed to "J" and 96° C. and then to "V" at 84° C. followed by full cooling.

Preparation of Resin IC (0.50% lime)

1026.8 grams of phenol; 1271.4 grams of formaldehyde solution and 1081.8 grams of water were charged and heated to 50° C. 20 grams of anhydrous lime (calcium hydroxide) was charged and held for 10 minutes below 65° C. 304 grams of sodium hydroxide solution were charged over 60 minutes holding the temperature at 65° C. The resin was heated to 96° C. and condensed to "B-C". 296 grams of sodium hydroxide solution were charged over 15 minutes and the mix was condensed to "J" at 96° C. and then to "V" at 84° C. followed by full cooling.

The composition of each resin on a weight percent basis is show in Table 1, below.

The specifications of each resin are listed in Table 2.

Part 2

Preparation and Foaming of Foamable Glue Mixes

Foamable glue mixes, Mix 1 and Mix 2, were made corresponding to each solution of advanced phenolic resin that was prepared. The formulations for glue mix 1 and glue mix 2 are described in Table 3.

The glue mix 1 using resin IA was made as follows. 20.4 grams of water and 0.8 grams of 40% glyoxal were mixed together with a spatula in beaker for a few seconds. 9.8 grams of dried blood were added and mixing was continued for one to two minutes. The mixture was left standing for five minutes and then mixed until smooth which took about two minutes. 70.1 grams of water was added and mixing was continued for about a half a minute. 348.2 grams of resin IA were added and mixing was continued for about two minutes. The glue mix was now ready for foaming.

In order to foam glue mix 1, 100 mls of the mix was placed in the cylinder of the mechanical foamer described above. The rotor of the foamer was then rotated at 650 RPM with an air pressure of 65 psi for one minute. The pressure was then released and the foam density of the foamed glue mix was measured as described above. The foam density was measured to be 0.302 grams/cc.

The above procedures were repeated twice. In one instance glue mix 1 was foamed for two minutes and in the second instance glue mix 1 was foamed for three minutes.

The preparation and foaming as described above was repeated for all resins and for all three time periods The density of each of the prepared foams was measured and all the results are recorded in Table 4.

EXAMPLE 2

PART 1

Preparation of Solutions of Highly Advanced Phenolic Resins

In Example 2, the resins were made from 4500 gram batches of a mixture of phenol (benzenol), formaldehyde, water, sodium hydroxide solution and lime. The phenol used was an aqueous solution containing 86.3% phenol; the formaldehyde solution used was a 50% aqueous solution; the sodium hydroxide solution used was a 50% aqueous solution and the lime was powdered anhydrous calcium hydroxide.

Three resins were prepared: Resin 2B, (control - no lime); Resin 2B containing 0.25% lime, and Resin 2C containing 0.50% lime.

Preparation of Resin 2A (control- no lime)

1164.2 grams of phenol, 1441.8 grams of formaldehyde solution and 1219.0 grams of water were charged in the reaction pot and heated to 50° C. 90.0 grams of sodium hydroxide solution were charged and the temperature was taken to 97° C. and held for 10 minutes. 252.0 grams of sodium hydroxide solution were charged over 15 minutes at 97° C. and condensed to "C-D". 333.0 grams of sodium hydroxide solution were charged over 18-20 minutes and condensed to "J-K" at 97° C. The resin was cooled to 80°-84° C. and condense to T/V and then fully cooled.

Preparation of Resin 2B (0.25% lime)

1164.2 grams of phenol, 1441.8 grams of formaldehyde solution and 1207.8 grams of water were charged into the reaction pot and heated at 50° C. 11.3 grams of anhydrous lime was charged with the temperature held below 65° C. for 10 minutes. 90.0 grams of sodium hydroxide solution were charged over ten minutes and the batch was then taken to 97° C. and held for 10 minutes 252.0 grams of sodium hydroxide solution were charged over 15 minutes and the batch was condensed to "C-D" at 97° C. 333 grams of sodium hydroxide solution were charged over 15 minutes and condensed to "J-K" at 97° C. The batch was cooled to 80°-84° C. and condensed to T/V and then fully cooled.

Preparation of Resin 2C (0.50% Lime)

1155.1 grams of phenol, 1430.4 grams of formaldehyde solution and 1217.0 grams of water were charged into the reaction pot and heated to 50° C. 22.5 grams of anhydrous lime were charged and the batch was held below 65° C. for ten minutes. 90.0 grams of sodium hydroxide solution were charged over 10 minutes. The batch was taken to 97° C. and held for ten minutes. 252.0 grams of sodium hydroxide solution were charged over 15 minutes and condensed to "CD" at 97° C. 333 grams of sodium hydroxide solution were charged over 15 minutes and condensed to "J-K" at 97° C. and cooled to 80°-84° C. and condensed to T/V and fully cooled.

The composition of each resin as calculated on a weight percent basis is shown in Table 1.

The specifications of each resin are listed in Table 2.

Part 2

Preparation and Foaming of Foamable Glue Mixes

The preparation and foaming of glue mixes was done in the same way as described in example one except that in this example Resins 2A, 2B and 2C were used.

The density of each of the foams prepared was measured and the measurements are recorded in Table 4.

TABLE 1

SPECIFICATIONS OF THE RESINS

| Resin | % Solids Content | Alkali % Content* | Viscosity** |
|---|---|---|---|
| Resin 1A (Control, no lime) | 40.6 | 7.45 | 1050 cps |
| Resin 1B (0.25% Lime) | 40.14 | 7.73 | 940 cps |
| Resin 1C (0.50% Lime) | 40.10 | 8.10 | 918 cps |
| Resin 2A (Control) | 39.93 | 7.46 | 858 cps |
| Resin 2B (0.25% Lime) | 40.25 | 7.76 | 922 cps |
| Resin 2C (0.50% Lime) | 39.90 | 8.16 | 846 cps |

*Alkali content is the calculated figure of the amount of anhydrous sodium hydroxide by weight, based on the total weight of the resin solution, that would provide the same degree of alkalinity that was provided by the sodium hydroxide and lime that was actually in the resin solution after it had been prepared.
**Viscosity as measured on a Brookfield RVF viscometer at 25° C. with a #2 spindle at 20 RPM.

TABLE 2

RESIN FORMULATIONS CALCULATED ON WEIGHT % BASIS

| | Resin Formulation, Percent by Weight | | | | | |
|---|---|---|---|---|---|---|
| Component | 1A | 1B | 1C | 2A | 2B | 2C |
| Phenol | 22.328 | 22.328 | 22.153 | 22.328 | 22.328 | 22.153 |
| Formaldehyde (50% solution; reported on as is basis) | 32.039 | 32.039 | 31.787 | 32.039 | 32.039 | 31.787 |
| Water | 30.633 | 30.383 | 30.560 | 30.633 | 30.383 | 30.560 |
| Lime (anhydrous calcium hydroxide) | — | 0.250 | 0.500 | — | 0.250 | 0.500 |
| Sodium Hydroxide (50% solution; reported on as is basis) | 7.600 | 7.600 | 7.600 | 2.000 | 2.000 | 2.000 |
| Sodium Hydroxide (50% solution; reported on as is basis) | 7.400 | 7.400 | 7.400 | 5.600 | 5.600 | 5.600 |
| Sodium Hydroxide (50% solution; reported on as is basis) | — | — | — | 7.400 | 7.400 | 7.400 |

TABLE 3

GLUE MIX COMPOSITIONS

| | Mix 1 | | Mix 2 | |
|---|---|---|---|---|
| Ingredient | Weight (Grams) | Weight % | Weight (Grams) | Weight % |
| Water | 20.4 | 20.1 | 13.9 | 20.8 |
| Glyoxal, 40% (Reported on as is basis) | 0.8 | 0.2 | 0.6 | 0.1 |
| Blood, spray dried (77 ± 2.5% solubility) | 9.8 | 2.2 | 6.7 | 1.5 |
| Water | 70.1 | | 79.6 | |
| Resin (Solution of highly advanced phenolic resin) | 348.9 | 77.5 | 349.2 | 77.6 |
| Total | 450.0 | 100 | 450.0 | 100. |

TABLE 4

FOAM DENSITY DATA

| | Mix I (2.17% Blood) | | Mix II (1.48% Blood) | |
|---|---|---|---|---|
| Resin # | Whip Time (minutes) | Foam Density (gram/cc) | Whip Time (minutes) | Foam Density (gram/cc) |
| | Example 1 | | | |
| 1A (0% Lime) | 1' | 0.302 | 1' | 0.230 |
| | 2' | 0.184 | 2' | 0.140 |
| | 3' | 0.136 | 3' | 0.111 |
| 1B (.25% Lime) | 1' | 0.231 | 1' | 0.172 |
| | 2' | 0.163 | 2' | 0.117 |
| | 3' | 0.114 | 3' | 0.155 |
| 1C (.50% Lime) | 1' | 0.198 | 1' | 0.156 |
| | 2' | 0.136 | 2' | 0.111 |
| | 3' | 0.106 | 3' | 0.107 |
| | Example 2 | | | |
| 2A | 1' | 0.321 | 1' | 0.213 |

TABLE 4-continued

FOAM DENSITY DATA

| Resin # | Mix I (2.17% Blood) | | Mix II (1.48% Blood) | |
|---|---|---|---|---|
| | Whip Time (minutes) | Foam Density (gram/cc) | Whip Time (minutes) | Foam Density (gram/cc) |
| (0% Lime) | 2' | 0.200 | 2' | 0.144 |
| | 3' | 0.117 | 3' | 0.100 |
| 2B | 1' | 0.300 | 1' | 0.238 |
| (.25% Lime) | 2' | 0.183 | 2' | 0.155 |
| | 3' | 0 120 | 3' | 0.098 |
| 2C | 1' | 0.256 | 1' | 0.194 |
| (.50% Lime) | 2' | 0.174 | 2' | 0.136 |
| | 3' | 0.107 | 3' | 0.091 |

The data of Table 4 is displayed graphically in FIG. 1 and FIG. 2. FIG. 1 is a graph based on data from Example 1 and FIG. 2 is a graph based on data from Example 2.

The data in Table 4, that are graphically displayed in FIG. 1 and FIG. 2, show that when other factors are kept essentially the same, glue mixes made with a solution greater foamability than glue mixes made with a solution of lime-free highly advanced phenolic resins. Another way to interpret the data is that lime-containing highly advanced phenolic resin has a greater inherent foamability than a solution of lime-free highly advanced phenolic resin because an otherwise comparable glue mix made with a solution of lime-containing highly advanced phenolic requires less blood as a foaming agent to achieve the same foamability as a glue mix made with a solution of lime-free advanced phenolic resin.

The data further demonstrate that a solution of 0.5% lime-containing highly advanced phenolic resin has greater inherent foamability than a solution of 0.25% lime-containing highly advanced phenolic resin. This indicates that the inherent foamability of a solution of lime-containing highly advanced phenolic resin varies directly with the amount of lime used. Applicants have determined that more than 1.0% lime should not be added to a highly advanced phenolic resin composition because lime will begin to precipitate out and adversely effect the resin.

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. An improved glue made by increasing the foamability of a glue comprising a solution of highly advanced phenolic resin, wherein said solution is the reaction product of a reaction mixture comprising phenol, aldehyde, water, and alkali, wherein said solution has a resin solids content of from about 35% to about 45% by weight and a viscosity of about 300 cps to about 1500 cps as measured on a Brookfield RVF viscometer at 25° C. with a #2 spindle at 20 RPM and wherein the increased foamability is brought about by the addition of soluble calcium compound to said reaction mixture at an early stage of the reaction in an amount of from about 0.25% to about 1% by weight based on the weight of said reaction mixture.

2. The improved glue of claim 1 wherein said calcium compound comprises calcium hydroxide, and wherein said alkali is sodium hydroxide.

3. The improved glue of claim 1 wherein said aldehyde is formaldehyde and said phenol is benzenol.

4. A foamable glue composition comprising in admixture animal blood, water, and highly advanced phenolic resin solution, wherein said highly advanced phenolic resin solution is the reaction product of a reaction mixture comprising a phenol, an aldehyde, water, alkali, and calcium hydroxide, wherein said highly advanced phenolic resin solution has a resin solids content of about 35–45% and a viscosity of 300 cps to 1500 cps as measured on a Brookfield RVF viscometer at 25° C. with a #2 spindle at 20 RPM and wherein the calcium hydroxide is added to said reaction mixture at an early stage of the reaction.

5. The composition of claim 4 wherein said alkaline earth hydroxide is selected from the group consisting of calcium hydroxide, magnesium hydroxide, barium hydroxide and mixtures thereof and wherein said alkali is sodium hydroxide.

6. The composition of claim 5 wherein said alkaline earth hydroxide is calcium hydroxide and wherein the amount of said alkaline earth oxide, anhydrous basis, is from an amount greater than zero up to about one percent by weight, based on the weight of said reaction mixture.

7. The composition of claim 6 wherein said aldehyde is formaldehyde and said phenol is benzenol.

8. A rapidly foamable, fast setting phenolic resin liquid glue comprising, in admixture:
 (a) a solution of highly advanced phenolic resin, said solution being the reaction product of a reaction mixture comprising phenol, aldehyde, water, alkali metal hydroxide and calcium hydroxide wherein said solution has a solids content of form about 35%–45% by weight and a viscosity of from about 300 cps to about 1500 cps as measured on a Brookfield RVF viscometer at 25° C. with a #2 spindle at 20 RPM;
 (b) dried animal blood; and optionally,
 (c) an aldehyde glue viscosity lowering agent and wherein the calcium hydroxide is added to said reaction mixture at an early stage of the reaction.

9. The glue of claim 8 wherein the alkaline earth hydroxide is calcium hydroxide and wherein the amount of said alkaline earth hydroxide, anhydrous basis, is from an amount greater than zero up to about one percent by weight, based on the weight of said reaction mixture.

10. A process for making foamable glue composition comprising dried animal blood, water, highly advanced phenolic resin is the reaction product of a reaction mixture comprising a phenol, an aldehyde, water, alkali metal hydroxide, and calcium hydroxide wherein said solution has a resin solids content of 35%–45% and a viscosity of about 300 cps to about 1500 cps as measured on a Brookfield RVF viscometer at 25° C. with a #2 spindle at 20 RPM and wherein the calcium hydroxide is added to said reaction mixture at an early stage of the reaction.

11. The process of claim 10 wherein said alkaline earth hydroxide is selected from the group consisting of lime, calcium hydroxide, magnesium hydroxide, barium hydroxide and mixtures thereof.

12. The process of claim 11 wherein said alkaline earth hydroxide is calcium hydroxide and wherein the amount of said alkali earth oxide, anhydrous basis, is from an amount greater than zero up to about one percent by weight, based on the weight of said reaction mixture.

13. The process of claim 12 wherein said aldehyde is formaldehyde and said phenol is benzenol.

14. A process for the production of laminate by bonding together with a foamed adhesive binder that is curable under heat and pressure, at least two plies having a layer of the foamed adhesive binder between them, comprising
   (1) applying to at least one surface of at least one lamina a foamed adhesive binder that is curable upon the application of heat, said adhesive binder comprising in admixture:
      (a) a solution of highly advanced phenolic resin said solution being the reaction product of a reaction mixture comprising phenol, aldehyde, water, alkali metal hydroxide and calcium hydroxide said solution having a resin solids content of from about 35%–45% by weight and a viscosity of from abut 300 cps to bout 1500 cps as measured on a Brookfield RVF viscometer at 25° C. with a #2 spindle at 20 RPM;
      (b) dried animal blood; and optionally
      (c) aldehyde glue viscosity lowering agent;
   (2) juxtaposing the lamina to which the adhesive binder has been applied with another lamina, and then
   (3) subjecting said juxtaposed laminae to heat and pressure to cure the resin and unite the laminae to form a laminate and wherein the calcium hydroxide is added to said reaction mixture at an early stage of the reaction.

15. The process of claim 14 wherein said alkaline earth hydroxide is selected from the group consisting of lime, calcium hydroxide, magnesium hydroxide, barium hydroxide and mixtures thereof and wherein said alkali metal hydroxide is sodium hydroxide.

16. The process of claim 15 wherein said alkaline earth hydroxide is calcium hydroxide and wherein the amount said alkaline earth hydroxide, anhydrous basis, is greater than zero and less than about one percent by weight based on the weight of said reaction mixture.

17. The process of claim 16 wherein said aldehyde is formaldehyde and said phenol is benzenol.

18. A process for making laminated cellulosic product in which two or more laminae are bonded together under heat and pressure wherein a bonding agent is applied to at least one of any two abutting surfaces of the laminae prior to the application of said heat and pressure wherein said bonding agent is a foamed glue composition comprising in admixture
   (a) dried animal blood,
   (b) water,
   (c) a solution of an advanced phenolic resin, said solution being the reaction product of a reaction mixture comprising phenol, aldehyde, water, alkali metal hydroxide and soluble calcium compound selected from the group consisting of calcium hydroxide and soluble calcium salt wherein said solution has a resin solids content of from about 35% to about 45% by weight and a viscosity of 300 cps to 1500 cps as measured on a Brookfield RVT viscometer at 25° C. with a #2 spindle at 20 RPM, and wherein the amount of said, soluble calcium compound anhydrous basis, is an amount greater than zero up to 1% by weight, based on the weight of said reaction mixture, and optionally,
   (d) aldehyde glue viscosity lowering agent and wherein the soluble alkaline earth salt is added to said reaction mixture at an early stage of the reaction.

19. The process of claim 18 wherein said alkaline earth compound is selected from the group consisting of lime, calcium hydroxide, magnesium hydroxide, barium hydroxide and mixtures thereof and wherein said alkali metal hydroxide is sodium hydroxide.

20. The process of claim 19 wherein said alkaline earth hydroxide is calcium hydroxide.

21. The process of claim 20 wherein said aldehyde is formaldehyde and said phenol is benzenol.

22. The process of claim 21 wherein said laminated cellulosic product is plywood.

23. A cured laminate of at least two cellulosic plies comprising
   a first ply,
   a second ply, and
   a cured phenolic glue interposed between said plies and bonding them together said glue comprising a bonding layer formed by interposing a layer of foamed glue between said plies and applying heat and pressure to cure the glue, wherein said foamed glue comprises a foamed mixture of
   (a) a solution of highly advanced phenolic resin, aid solution being the reaction product of a reaction mixture comprising phenol, aldehyde, water, alkali metal hydroxide and calcium hydroxide wherein said solution has a solids content of from about 35%–45% by weight and a viscosity of from about 300 cps to about 1500 cps as measured on a Brookfield RVF viscometer at 25° C. with a #2 spindle at 20 RPM;
   (b) dried animal blood; and optionally,
   (c) an aldehyde glue viscosity lowering agent and wherein the calcium hydroxide is added to said reaction mixture at an early stage of the reaction.

24. The cured laminate of claim 23 wherein said the alkaline earth hydroxide is calcium hydroxide and wherein the amount of said alkaline earth hydroxide, anhydrous basis, is from an amount greater than zero up to about one percent by weight, based on the weight of said reaction mixture.

25. The cured laminate of claim 23 wherein said alkaline earth hydroxide is selected from the group consisting of lime, calcium hydroxide, magnesium hydroxide, barium hydroxide and mixtures thereof.

26. The cured laminate of claim 24 wherein said aldehyde is formaldehyde and said phenol is benzenol.

27. The cured laminate of claim 23 wherein the foam density of said foamed glue at the time of application was 0.18 gm/cc or less.

* * * * *